May 17, 1960   L. N. SMITH   2,936,735
CATTLE FEEDER
Filed March 24, 1958   2 Sheets-Sheet 2
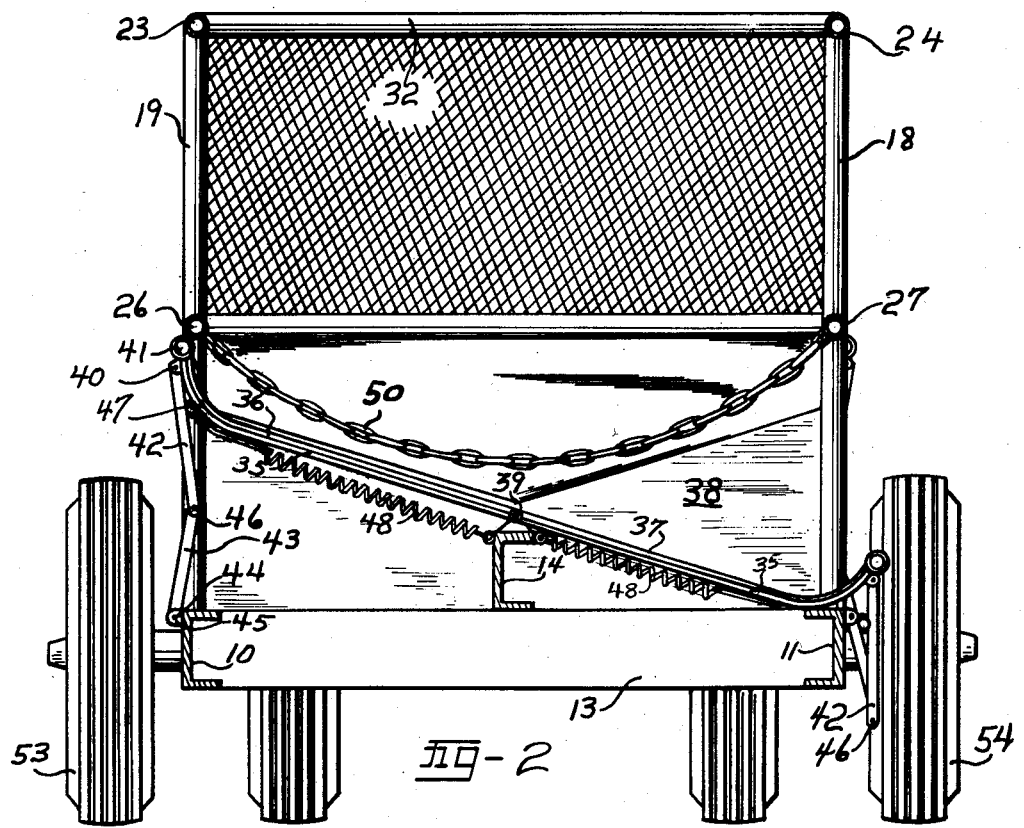
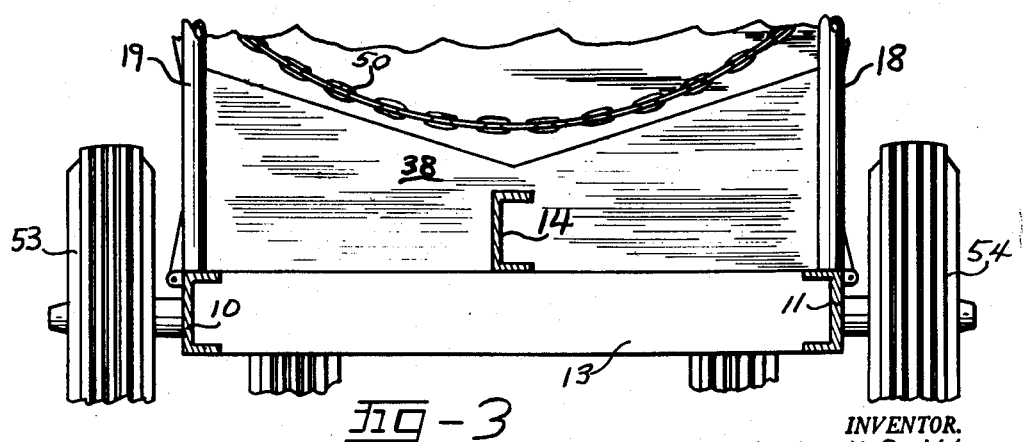
INVENTOR.
Lucius N. Smith
BY
Jennings Carter & Thompson
Attorneys United States Patent Office 2,936,735
Patented May 17, 1960

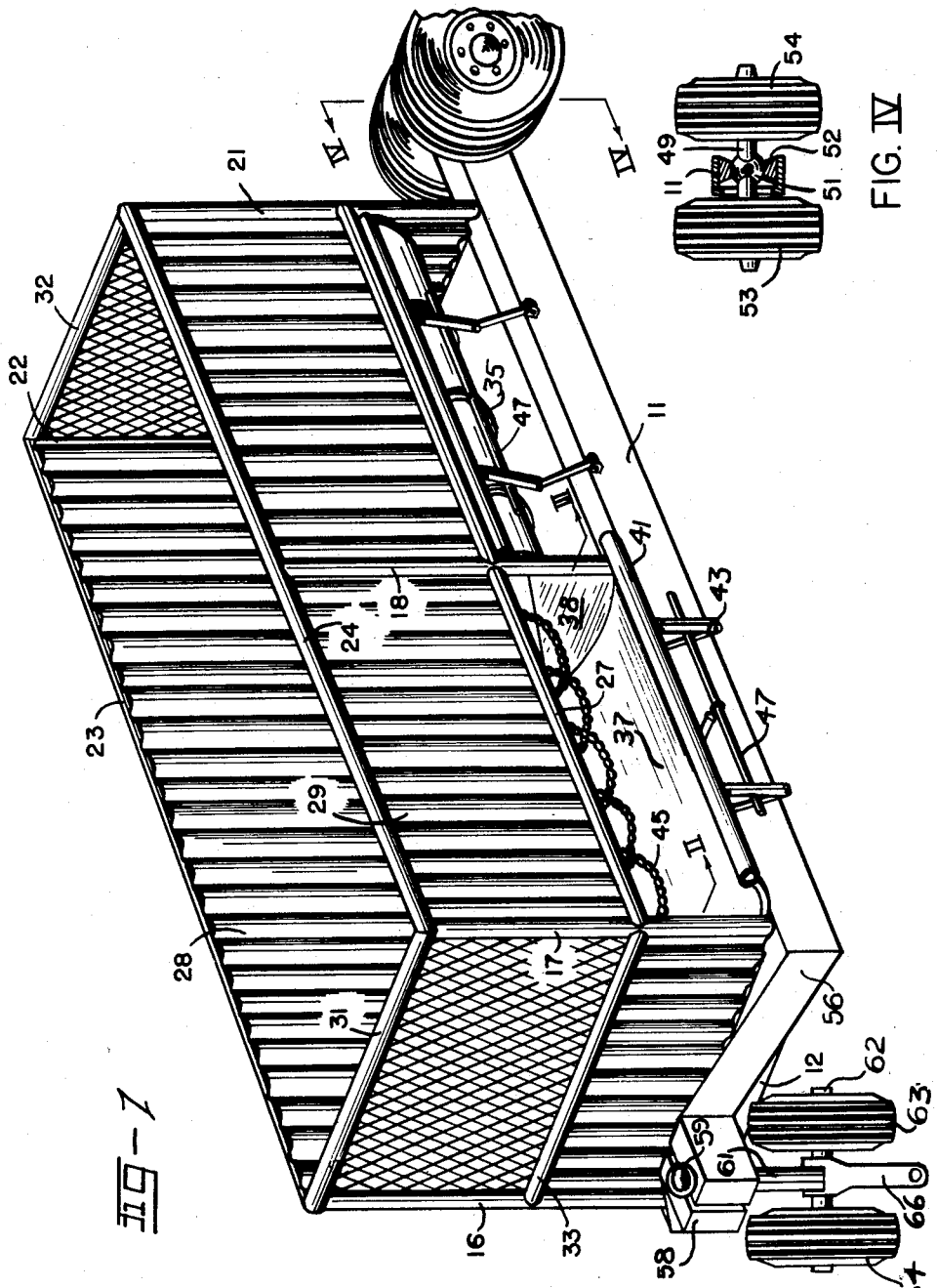

2,936,735
CATTLE FEEDER
Lucius N. Smith, Montverde, Fla.
Application March 24, 1958, Serial No. 723,214
8 Claims. (Cl. 119—52)

This invention relates to a mobile cattle feeder and has for an object the provision of a feeder which shall be adapted to serve as a wagon or trailer in which forage may be collected and hauled as it is harvested and by a simple manipulation of the lower side members converted to a feeder for cattle.

A further object of my invention is to provide a vehicle having a body adapted to receive and hold forage or other feed and which is provided with bottom members hinged inwardly of the sides of the vehicle and adapted to be moved to one position in which they form vehicle sides when retaining and transporting feed, and also adapted to be moved to another position where they form downwardly inclined feed troughs into which the feed moves by gravity.

A still further object of my invention is to provide a vehicle with combined bottom and side members comprising plates hinged along the longitudinal center of the vehicle with their outer edge portions curved upwardly, together with link members to support and hold the outer edge portions in raised position, whereby when the outer edge portions are raised they form sides for the lower portion of the vehicle and when lowered the upwardly curved portions form feed troughs.

In the raising of cattle it has been found that a far greater amount of grass or other forage will grow on ground which is not pastured than on ground which is pastured. It has also been found that cattle put on weight much faster where forage is brought to them to be consumed than where they are obliged to graze over a large area to obtain their food. This is especially true in warm weather when the cattle are prone to seek shade rather than graze and thus consume less food than is the case when they are fed. As heretofore practiced, the cutting and feeding of forage has involved first, the cutting of the forage and loading it on a truck or wagon, hauling it to the location where it is to be consumed, and then unloading it or storing it as silage. It is accordingly a prime object of my invention to provide a vehicle which is adapted for conveying the forage to the location where it is to be consumed and the vehicle there be converted to a feeder.

Briefly, my invention comprises a vehicle having a rectangular frame with a central beam extending from front to rear over the other frame members midway between the sides. Bottom members in the form of flat plates with upwardly curved outer edge portions are hinged together along the central beam whereby the outer edge portions may be raised and lowered. When in lowered position they form a downwardly inclined floor terminating in a feed trough which is formed by the upwardly curved portions. When in raised position the outwardly curved portions assume a more or less vertical inclination which retains the forage. The bottom members are retained in raised position by means of links hinged together and pivoted to the outer edge of the bottom members and to the frame. When in raised position, the hinge pivot between the links lies inwardly of a line between the other pivot points of the links, further inward movement being limited by engagement with the under surface of the bottom members. It is only necessary to move the hinge portion outwardly past their "dead center" positions in order to lower the bottom members for feeding. The vehicle is provided with fixed end walls and upper side walls to provide the necessary capacity.

Another feature of my invention consists in the manner in which I mount the wheels on the vehicle in order to adapt it for hauling over rough or uneven ground. I extend the side frame members rearwardly of the vehicle body and mount two wheels, one on each side, of each of the side frame members. The pairs of wheels are each mounted on a single axle which is hinged in the associated frame member whereby it is free to oscillate in a vertical plane. At the front of the vehicle I provide a wheel support in which is journalled a vertical post having a tongue for connection to a tractor. An axle is mounted in the lower end of the vertical post the latter being adapted to turn in its support.

These and other features of my invention are illustrated in the accompanying drawing forming a part of this application in which:

Fig. 1 is an isometric view of the feeder;
Fig. 2 is a section taken along the line II of Fig. 1 and shows one of the bottom members in lowered, feeding position;
Fig. 3 is a section taken along the line III of Fig. 1 showing the construction of the partition member between the sections of the feeder; and,
Fig. 4 is a section taken along the line IV—IV of Fig. 1.

Referring to the drawing for a better understanding of my invention my improved feeder comprises a rectangular frame having side members 10 and 11 in the form of channel beams, end channel members 12 and 13, and a central channel member 14 mounted over the end channel members 12 and 13 and extending from end to end of the feeder midway between the sides. Erected on the side beam members 10 and 11 are vertical front posts 16 and 17, vertical intermediate posts 18 and 19, and rear vertical posts 21 and 22. The vertical posts 16 and 22, and 17 and 21 are connected by means of upper horizontal members 23 and 24 and intermediate horizontal members 26 and 27 which are interposed midway between the members 24 and the side frame members 10 and 11. These frame members form an enclosure with side walls 28 and 29 which extend from the longitudinal members 23 and 24 down to the intermediate members 26 and 27. The frame members 23 and 24 are connected by means of transverse horizontal frame members 31 and 32 at the top and similar transverse horizontal members such as 33 at the front and a similar horizontal member at the rear (not shown). End walls are secured to the upright posts 16 and 17 and 21 and 22 which extend from top to bottom of the enclosure.

The bottom of the feeder is comprised of four bottom members, two at each end of the feeder, forming front and rear sections. Those in the front section of the feeder are shown in detail in Fig. 2 of the drawing at 36 and 37. The bottom members at the rear of the feeder are the same as those at the front and description of those at the front will be sufficient. Separating the front and rear sections of the feeder is a partition 38 which extends up between the side members 18 and 19 a sufficient distance so that when one section is opened for feeding, feed cannot fall out over the ends of the bottom members which have not been lowered.

The bottom members 36 and 37 are mounted over the center frame member 14 and are secured to a piano hinge 39 which extends the length of the members. Each of the members 36 and 37, as shown, is comprised of a flat plate which is curved at its outer edge and has a pipe section 41 welded along its outer edge to add stiffness and prevent injury to the cattle. Stiffening ribs 35 are provided at intervals on each of the bottom members. As shown in Fig. 2, the bottom member 37 is in its lowered position, and in that position, the corresponding side is open from the horizontal member 27 down to the side frame member 11 to permit feed to fall down onto the member and be restrained by the upwardly curved portion thereof whereby cattle can feed.

The outer portions of the bottom members 36 and 37 are each supported by a pair of links 42 and 43. The link 42 is connected to a bracket 40 on the pipe section 41 at the upper edge of the member 36 and the link 43 is connected at 44 to a bracket 45 on the lower side frame member 10. The two links 42 and 43 are hinged together at 46. Connecting each pair of the links is a longitudinally extending rod 47. The links are of such length that when the associated bottom member is raised, the rod 47 engages the bottom of the bottom member and the hinge point 46 between the links 42 and 43 passes a line joining the pivot points at the ends of the links and so hold the associated bottom member in its raised position.

Whenever it is desired to lower a bottom member the rod 47 is pulled outward and the bottom member falls down by gravity with its outer edge resting on the associated side frame member. In order to aid in raising the bottom frame members I connect springs 48 to the center frame member 14 and to the rod 47 which springs are always in tension and which aid in raising the associated bottom frame member.

In order to prevent forage from falling too fast onto the lowered bottom members when cattle are feeding, I preferably provide a plurality of chains 50 which are secured at their ends to the side members 26 and 27 and hang loosely across the feeder. These chains are close enough to hold the forage up but permit it to fall through as the cattle are feeding and shaking the chains. A spacing of approximately one foot I have found to be satisfactory.

The side frame members 10 and 11 extend rearwardly of the feeder, as shown in Fig. 4, and extending transversely of each is an axle 49 which is provided intermediate the ends with a bearing portion 51 mounted in bearings 52 in the frame member 11 whereby it may rock in a vertical plane. Mounted on the ends of each of the axles are wheels 53 and 54. The axle 49 being disposed to rock only in a vertical plane, allowing the wheels 53 and 54 to follow the contour of the ground over which the vehicle is moving.

At the front of the vehicle, the side frame members are extended forwardly and joined together to form a relatively short upturned beam section 56 which is turned horizontally at its upper outward end 58. Extending down through the horizontal portion 58 is a shaft 59 which is secured to the horizontal portion 58 in any suitable manner. Surrounding the shaft 59 is a sleeve 61 and secured to the lower end of the sleeve 61, as by welding is a relatively short axle 62. Mounted on the ends of the axle 62 are wheels 63 and 64. The sleeve 61 being free to turn about the shaft 59, the wheels may be turned in whatever direction the vehicle may be drawn. A tongue 66 is secured to the front of the axle 62 which may be attached to a tractor for drawing the vehicle, as is well understood.

From the foregoing description, the operation of my improved feeder will be readily understood. It is contemplated that the vehicle with the bottom members 36 and 37 in their raised position will be pulled by a tractor alongside a forage cutter in operation whereby the forage is delivered into the feeder as fast as it is being cut. When loaded, the vehicle is drawn to the location where the cattle are to be fed and one or more of the bottom members 36, 37, may be lowered by grasping the rods 47 and pulling outwardly so that the hinge point 46 between the links 42 and 43 is pulled outside the line of direction between the points 41 and 44. The forage then falls by gravity down the inclined bottoms where it is in reach of the cattle being fed. As the cattle continue to feed, they shake the chains 50 thus causing more feed to fall down. As will be seen from Fig. 2 of the drawing, when one of the bottom members 36, 37 is down and the other in the up position, the forage is free to move down the inclined bottom member from one side to the other in reach of the cattle.

Inasmuch as very little labor is involved in harvesting and feeding the forage in accordance with my invention, it will be readily apparent that by means of my invention I have provided a means whereby a greater yield of forage may be obtained from a given acreage than where the ground is being grazed and the forage be placed within easy reach of the cattle being fed, whereby a quicker and more satisfactory return in the way of growth of the cattle is obtained.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. A mobile cattle feeder comprising a rectangular frame having end and side members, a rectangular body mounted on the frame, a beam extending longitudinally of the frame midway between the side members, substantially flat bottom members hinged to said beam along a line parallel with the sides of the frame for raising and lowering the outer edge portions thereof, each of said bottom members being effective to form a side wall for the feeder when in raised position, upturned outer edge portions on the bottom members effective to form feed troughs when in lowered positions, supporting links for the bottom members comprising pairs of link members hinged together and pivotally connected to the outer edge portions of the bottom members and to the adjacent portion of the side members of the frame respectively, said links being constructed and arranged to engage the bottom members to hold said links against accidental displacement when the bottom members are in raised position.

2. A cattle feeder as defined in claim 1 in which inward movement of the supporting links relative to the frame is limited by the bottom members when said bottom members are in raised position and in which the hinge between each pair of links is in a position inwardly of a line between their pivotal connections with the bottom members and the frame when the associated bottom members are in raised position.

3. A mobile cattle feeder comprising a rectangular frame having side members and end frame members joining the side members, a central frame member mounted over the end frame members midway between the side frame members and extending the length of the frame, bottom members comprising metal plates hingedly connected to each other over the central frame member to be raised and lowered and extending outwardly and downwardly for the outer portions thereof to rest on the side frame members when in lowered position and to close the side of the feeder when in raised position, upwardly curved outer edge portions on the bottom members forming feed troughs when in lowered position, a plurality of pairs of links for supporting the bottom members, each pair having one link pivotally connected at one end to the outer edge portion of the accompanying bottom member and the other link pivotally connected at one end to the adjacent side frame member and said links being pivotally connected to each other, the pivotal connections between the links of each pair being disposed inwardly of a line joining the pivotal connections of the ends of the links to the bottom members and to the frame when the accompanying bottom member is in raised position, the inward movement of said links being limited by said bottom members.

4. A cattle feeder as defined in claim 3 in which the upper surface of a bottom member from the inward edge to the upwardly curved position on one side when in raised position lies in substantially a common downwardly inclined plane with the corresponding upper surface of the opposite bottom member to which it is hinged when in lowered position.

5. A cattle feeder as defined in claim 3 including a plurality of spaced apart pairs of supporting links connected to each bottom member and to the adjacent side of the frame, a rod extending parallel to the side of the frame rigidly connected to said pairs of links for operating the links in unison when raising and lowering the bottom member, and a spring in tension connecting the said rod to the central frame member.

6. A cattle feeder as defined in claim 3 provided with fixed end walls and with fixed side walls above the outer edge portions of the bottom members when the latter are in raised position.

7. A cattle feeder as defined in claim 3 in which the side frame members extend rearwardly of the frame and a pair of wheels are mounted on a single axle on each of the rearwardly extended side frame members, and the axle is mounted to pivot in a vertical plane, and in which a pair of wheels are mounted on an axle in a wheel supporting member provided at the front of the frame and the wheel supporting member is adapted to turn about a vertical axis.

8. A cattle feeder as defined in claim 3 provided with end walls and with side walls extending upwardly from the bottom members when in raised position, and in which a plurality of spaced apart chains are suspended loosely across the feeder above the bottom members with ends thereof secured to the side walls to impede the fall of feed onto the bottom members.

References Cited in the file of this patent

UNITED STATES PATENTS

| | | |
|---|---|---|
| 644,890 | Bellows | Mar. 6, 1900 |
| 1,469,129 | Westerman | Sept. 25, 1923 |
| 1,503,335 | Rose | July 29, 1924 |
| 1,619,172 | Went | Mar. 1, 1927 |
| 1,720,884 | Clarke | July 16, 1929 |
| 2,290,042 | Granville | July 14, 1942 |